United States Patent [19]

Varadaraj et al.

[11] Patent Number: 5,797,700
[45] Date of Patent: Aug. 25, 1998

[54] POLYOXYETHYLENE GLYCOL AND POLYGLYCEROL TWIN TAIL SURFACTANT FORMULATIONS FOR DISPERSION OF CRUDE OIL

[75] Inventors: Ramesh Varadaraj, Flemington; Max Leo Robbins, South Orange; Salvatore James Pace, Milford; Cornelius Hendrick Brons, Washington, all of N.J.

[73] Assignee: Exxon Research and Engineering Company, Florham Park, N.J.

[21] Appl. No.: 738,671

[22] Filed: Oct. 25, 1996

[51] Int. Cl.$^6$ .................... E02B 15/00; C02F 1/24
[52] U.S. Cl. .................... 405/60; 210/924; 210/925; 508/496; 508/501
[58] Field of Search .................... 405/60, 263; 210/922, 210/924, 925; 508/496, 501

[56] References Cited

U.S. PATENT DOCUMENTS

| | | | |
|---|---|---|---|
| 3,810,835 | 5/1974 | Ferm | 210/925 X |
| 4,110,213 | 8/1978 | Tennant et al. | 210/925 X |
| 4,469,603 | 9/1984 | Lepain et al. | 210/925 |
| 4,502,962 | 3/1985 | Becker et al. | 210/925 X |
| 4,597,893 | 7/1986 | Byford et al. | 210/925 X |
| 5,406,019 | 4/1995 | Dean | 405/60 X |

*Primary Examiner*—George A. Suchfield
*Attorney, Agent, or Firm*—Gerard J. Hughes

[57] ABSTRACT

The present invention provides a composition for dispersing oil slicks comprising a twin tail surfactant or mixture of twin tail surfactants having the general formula:

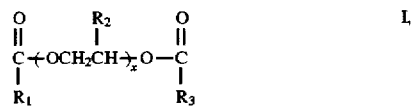

wherein $R_1$ and $R_3$ may be the same or different alkyl or alkenyl groups; $R_2$ is H or OH; and x is from 1 to about 20.

5 Claims, No Drawings

POLYOXYETHYLENE GLYCOL AND POLYGLYCEROL TWIN TAIL SURFACTANT FORMULATIONS FOR DISPERSION OF CRUDE OIL

FIELD OF THE INVENTION

The present invention relates generally to the chemical dispersion of oil slicks and more particularly to the dispersion of heavy waxy crudes and resids.

BACKGROUND OF THE INVENTION

The accidental discharge of crude oil into marine or fresh water environments if not effectively treated can result in oiling of the shoreline. Therefore, a number of techniques have been devised to minimize shoreline oiling resulting from such accidents when they occur.

One method for dealing with oil slicks on water is to treat the oil slick with a chemical dispersant which breaks the oil film into droplets which readily become dispersed into the water column thereby preventing the oiling of the shoreline. This technique is effective with light and medium crude oils, at least under optimum application conditions and wave energy. Unfortunately, however, laboratory dispersant effectiveness testing has shown that viscous and waxy crudes are more difficult to disperse with currently available dispersants than crudes with low viscosity and wax. With the projected increase in traffic in the heavier and waxier crude oils there is a need for approved dispersants that are effective over a wide range of crudes encompassing light, medium, and heavy waxy crudes.

Accordingly, one object of the present invention is to provide surface active compositions which are capable of dispersing a wide range of crudes.

Another object of the present invention is to provide dispersant compositions that are particularly suitable for dispersing heavy and waxy crudes.

SUMMARY OF THE INVENTION

Broadly stated, the present invention provides a composition for dispersing oil slicks comprising a twin tail surfactant or mixture of twin tail surfactants having the general formula:

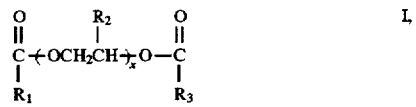

wherein $R_1$ and $R_3$ may be the same or different alkyl or alkenyl groups; $R_2$ is H or OH; and x is from 1 to about 20. The composition also includes a carrier solvent. In a preferred embodiment of the invention, the composition also includes a single tail surfactant having the general formula:

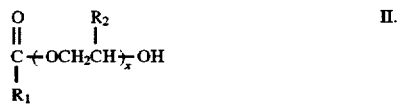

where x, $R_1$ and $R_2$ are as previously defined.

In another embodiment of the present invention, there is provided a method for dispersing oil slicks on water, especially oil slicks of heavy and waxy crudes comprising applying a solution on the surface of the oil slick wherein the solution contains a surfactant or mixture of surfactants selected from the group consisting of a twin tail surfactant, a mixture of twin tail surfactants, a mixture of a single tail surfactant with a twin tail surfactant and a mixture of single tail surfactants, having the formulae set forth above.

DETAILED DESCRIPTION OF THE INVENTION

The compositions of the present invention are effective in dispersing crude oils in marine and fresh water environments. Importantly, the compositions of the present invention are particularly capable of dispersing heavy waxy crudes and resids in marine and fresh water environments, such as crudes and resids having viscosities ranging from about 2000 to 14,000 centerpoise at 25° C. and API gravities less than 25.

The composition used in the practice of the present invention comprises a surfactant or mixture of surfactants having the general formula:

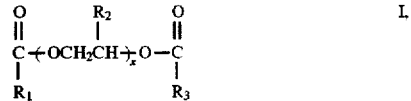

wherein $R_1$ and $R_3$ may be the same or different alkyl or alkenyl groups; $R_2$ is H or OH; and x is from 1 to about 20.

In the practice present invention it is preferred that $R_1$ and $R_3$ are selected from alkyl or alkenyl groups having from about 8 to about 20 carbon atoms. Additionally, in the practice of the present invention it is preferred that $R_2$ is H and x is in the range of 3 to 15.

Compounds having the formula I are commercially available. Typically, these commercial materials are a mixture in which x in the formula varies over a range of values. These mixtures have been found to be quite useful in the practice of the present invention.

In a preferred embodiment of the present invention, the composition includes a single tail surfactant having the formula

where $R_1$ and $R_2$ and x are as previously defined.

In general, when the composition includes a single tail surfactant the ratio of twin tail to single tail surfactant is adjusted as to provide an HLB in the range of from about 6 to 15. Optimum HLB depends on oil type, salinity of water and other factors known in the art.

In order to be able to efficiently distribute the surface active agent on an oil slick, it is particularly preferred that the surface active agent be dissolved in a hydrocarbon solvent. Suitable solvents that are used in the practice of the present invention include paraffinic, naphthenic and aromatic solvents and mixtures thereof It is particularly preferred, however, to use normal paraffinic solvents sold under the trade name Norpar-13 by Exxon USA, Houston, Tex. as the carrier solvent.

The amount of solvent employed is not critical; however, sufficient solvent is used to dissolve the surface active agent or mixture thereof Amounts of solvent higher than that necessary to dissolve the surfactant can be used, especially if the composition is going to be applied at temperatures at or below 20° C. As a general guide, the amount of surfactant used will be about in the range of about 5 to about 75 wt % based on the total weight of surfactant and solvent.

The amount of the composition applied to an oil slick will vary widely. Generally, an amount sufficient to disperse at least some of the oil that will be applied. Also, while the compositions are especially useful in dispersing heavy and waxy crudes, they are suitable for treatment of lighter crudes as well.

The effectiveness of the compositions of the present invention are illustrated in the following examples.

EXAMPLES 1–6

(A) Dispersant Formulations

A series of dispersant formulations were prepared using varying amounts of a twin tail surfactant and a single tail surfactant. The twin tail surfactant used was pentaoxyethylene dioleyl ester. The single tail surfactant used was pentaoxyethylene mono oleyl ester. The amounts of each are shown in Table 1. Each formulation contained 50 wt. % of a normal paraffinic solvent sold under the trade name Norpar-13 by Exxon USA, Houston, Tex. The formulations were then tested as outlined below.

(B) Dispersant Effectiveness Testing

The dispersant was premixed into a crude oil or resid at a dispersant to oil ratio of 1:15. Next 150 ml. of synthetic sea water was placed in a 300 ml 4-baffled bottom flask and 0.533 g of treated crude oil was added to the flask. The oil to water ratio was 1:300. The flask was placed on an orbital shaker and shaken at 125 rpm for 45 minutes. After mixing for 45 minutes the contents of the flask were transferred to a 250 ml separatory funnel to allow the undispersed droplets to coalesce. The contents were immediately withdrawn up to the coalesced oil. The withdrawn, dispersed phase was analyzed for % dispersion and mean droplet size by a Coulter Counter technique using a Coulter Multisizer II instrument.

In Table 1, the types of oil tested, the percent dispersion and mean droplet size are given. As can be seen from the data it is clear that as the weight percent of twin tail surfactants is increased in the formulation that the percent dispersion is significantly increased from no dispersion with a single tail surfactant (the Comparative Example) to an 86 percent dispersion with 40 weight percent twin tail surfactant in the formulation. The mean droplet size of the droplets also decreases correspondingly from about 37 microns to about 25 microns.

TABLE I

| Example | Wt % Single Tail Surfactant | Wt % Twin Tail Surfactant | %, Dispersion | Droplet Size, Microns |
|---|---|---|---|---|
| Comparative | 50% | 0% | none | — |
| 1 | 35% | 15% | 28.4 | 36.8 |
| 2 | 25% | 25% | 26.2 | 34.2 |
| 3 | 20% | 30% | 56.5 | 32.0 |
| 4 | 13% | 37% | 58.3 | 28.7 |
| 5 | 10% | 40% | 86.0 | 25.8 |

What is claimed is:

1. A composition for dispersing oil slicks comprising:

a twin tail surfactant or mixture of surfactants having the formula:

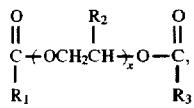

a single tail surfactant having the formula:

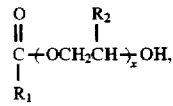

and a hydrocarbon solvent, wherein $R_1$ and $R_3$ are independently selected alkyl or alkenyl groups having from about 8 to about 20 carbon atoms, $R_2$ is H, and x is an integer ranging from 3 to 15.

2. A method for dispersing an oil slick on water comprising applying a hydrocarbon solution to the oil slick of a surfactant or mixture of surfactants selected from the group consisting of a twin tail surfactant, a mixture of twin tail surfactants and a mixture of a single tail surfactant with a twin tail surfactant, and a mixture of a single tail surfactant with a mixture of twin tail surfactants, the twin tail surfactant or surfactants having the formula:

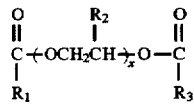

and the single tail surfactant having the formula:

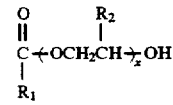

wherein $R_1$ and $R_3$ are the same or different alkyl or alkenyl groups; $R_2$ is H or OH; and x is from 1 to about 20.

3. The method of claim 2 wherein $R_2$ is H; and x is from 3 to 15.

4. The method of claim 3 wherein the surfactants are a mixture of a single tail surfactant with a twin tail surfactant.

5. The method of claim 3 wherein the surfactants are a mixture of a single tail surfactants with a mixture of twin tail surfactants.

* * * * *